United States Patent
Iijima et al.

(10) Patent No.: US 11,353,329 B2
(45) Date of Patent: Jun. 7, 2022

(54) AUTOMATED DRIVING DEVICE

(71) Applicant: TOYOTA JIDOSHA KABUSHIKI KAISHA, Toyota (JP)

(72) Inventors: Akira Iijima, Nagoya (JP); Hiroaki Sakakibara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 165 days.

(21) Appl. No.: 16/592,937

(22) Filed: Oct. 4, 2019

(65) Prior Publication Data
US 2020/0166351 A1 May 28, 2020

(30) Foreign Application Priority Data

Nov. 28, 2018 (JP) .............................. JP2018-222632

(51) Int. Cl.
*G01C 21/34* (2006.01)
*G05D 1/00* (2006.01)
*G01C 21/36* (2006.01)

(52) U.S. Cl.
CPC ..... *G01C 21/3415* (2013.01); *G01C 21/3453* (2013.01); *G01C 21/3605* (2013.01); *G05D 1/0088* (2013.01)

(58) Field of Classification Search
CPC ............ G01C 21/3415; G01C 21/3453; G01C 21/3605; G01C 21/3446; G01C 21/3492; G05D 1/0088; G05D 1/0251; G05D 1/0223; G05D 1/0257; G05D 1/0276; G05D 2201/02

USPC .......................................................... 701/23
See application file for complete search history.

(56) References Cited

U.S. PATENT DOCUMENTS

| | | | |
|---|---|---|---|
| 2004/0204846 A1 | 10/2004 | Yano et al. | |
| 2018/0188743 A1* | 7/2018 | Wheeler | G06F 16/9024 |
| 2018/0364058 A1* | 12/2018 | Hisano | G09B 29/106 |
| 2019/0278286 A1* | 9/2019 | Ueda | B60W 50/00 |

FOREIGN PATENT DOCUMENTS

| | | |
|---|---|---|
| JP | 2003-232645 A | 8/2003 |
| JP | 2004-061356 A | 2/2004 |
| JP | 2017-110924 A | 6/2017 |
| WO | 2016/171022 A1 | 10/2016 |

* cited by examiner

*Primary Examiner* — Paula L Schneider
(74) *Attorney, Agent, or Firm* — Oblon, McClelland, Maier & Neustadt, L.L.P.

(57) ABSTRACT

An automated driving device includes: a navigation unit configured to retrieve one or more partial routes with a predetermined length other than a guide route which branch from the guide route at a branch point through which a vehicle is expected to pass before the vehicle passes through the branch point; and an electronic control unit configured to control automated driving of the vehicle based on information of a specific partial route out of the one or more partial routes in a period until the navigation unit completes retrieval of a redundant route for guiding the vehicle to a destination point when the vehicle departs from the guide route at the branch point and travels on the specific partial route.

8 Claims, 5 Drawing Sheets

AUTOMATED DRIVING DEVICE

INCORPORATION BY REFERENCE

The disclosure of Japanese Patent Application No. 2018-222632 filed on Nov. 28, 2018 including the specification, drawings and abstract is incorporated herein by reference in its entirety.

BACKGROUND

1. Technical Field

The present disclosure relates to an automated driving device.

2. Description of Related Art

Recently, automated driving of a vehicle has been researched and developed. Automation levels of automated driving are classified into no automation (level 0), driving support (level 1), partial driving automation (level 2), conditional automated driving (level 3), highly automated driving (level 4), and full automated driving (level 5). As the automation level becomes higher, cooperation between an electronic control unit that controls automated driving and a navigation unit becomes more important. As such a type of navigation unit, a navigation unit having a rerouting function is known in the related art, for example, as described in Japanese Unexamined Patent Application Publication No. 2003-232645 (JP 2003-232645 A). A rerouting function is a function of retrieving a redundant route to a destination point and performing guidance when a vehicle departs from a guide route to the destination point.

SUMMARY

However, a certain retrieval time is required until retrieval of a redundant route to a destination point is completed after the rerouting function has been started. An electronic control unit that controls automated driving based on information of a route to the destination point which is retrieved by the navigation unit cannot receive information of a redundant route to the destination point from the navigation unit before retrieval of a redundant route using the rerouting function has been completed. Accordingly, cooperation between the electronic control unit that controls automated driving and the navigation unit is temporarily suspended due to start of the rerouting function, and the electronic control unit temporarily controls automated driving along the road.

Therefore, the present disclosure provides an automated driving device that can minimize suspension of cooperation between an electronic control unit that controls automated driving and a navigation unit.

According to an aspect of the present disclosure, there is provided an automated driving device including: a navigation unit configured to retrieve one or more partial routes with a predetermined length other than a guide route which branch from the guide route at a branch point through which a vehicle is expected to pass before the vehicle passes through the branch point; and an electronic control unit configured to control automated driving of the vehicle based on information of a specific partial route out of the one or more partial routes in a period until the navigation unit completes retrieval of a redundant route for guiding the vehicle to a destination point when the vehicle departs from the guide route at the branch point and travels on the specific partial route. Here, the predetermined length is set such that the navigation unit completes retrieval of the redundant route before traveling of the vehicle on the specific partial route is completed. Accordingly, even when the navigation unit starts retrieval of a redundant route with departure of the vehicle from the guide route as a trigger, it is possible to minimize suspension of cooperation between the electronic control unit and the navigation unit.

According to another aspect of the present disclosure, there is provided an automated driving device including: a navigation unit configured to receive a result of retrieval of one or more partial routes with a predetermined length other than a guide route which branch from the guide route at a branch point through which a vehicle is expected to pass from a route retrieval server before the vehicle passes through the branch point; and an electronic control unit configured to control automated driving of the vehicle based on information of a specific partial route out of the one or more partial routes in a period until the route retrieval server completes retrieval of a redundant route for guiding the vehicle to a destination point when the vehicle departs from the guide route at the branch point and travels on the specific partial route. Here, the predetermined length is set such that the route retrieval server completes retrieval of the redundant route before traveling of the vehicle on the specific partial route is completed. Accordingly, even when the route retrieval server starts retrieval of a redundant route with departure of the vehicle from the guide route as a trigger, it is possible to minimize suspension of cooperation between the electronic control unit and the navigation unit.

According to the aspects of the present disclosure, it is possible to minimize suspension of cooperation between an electronic control unit that controls automated driving and a navigation unit.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
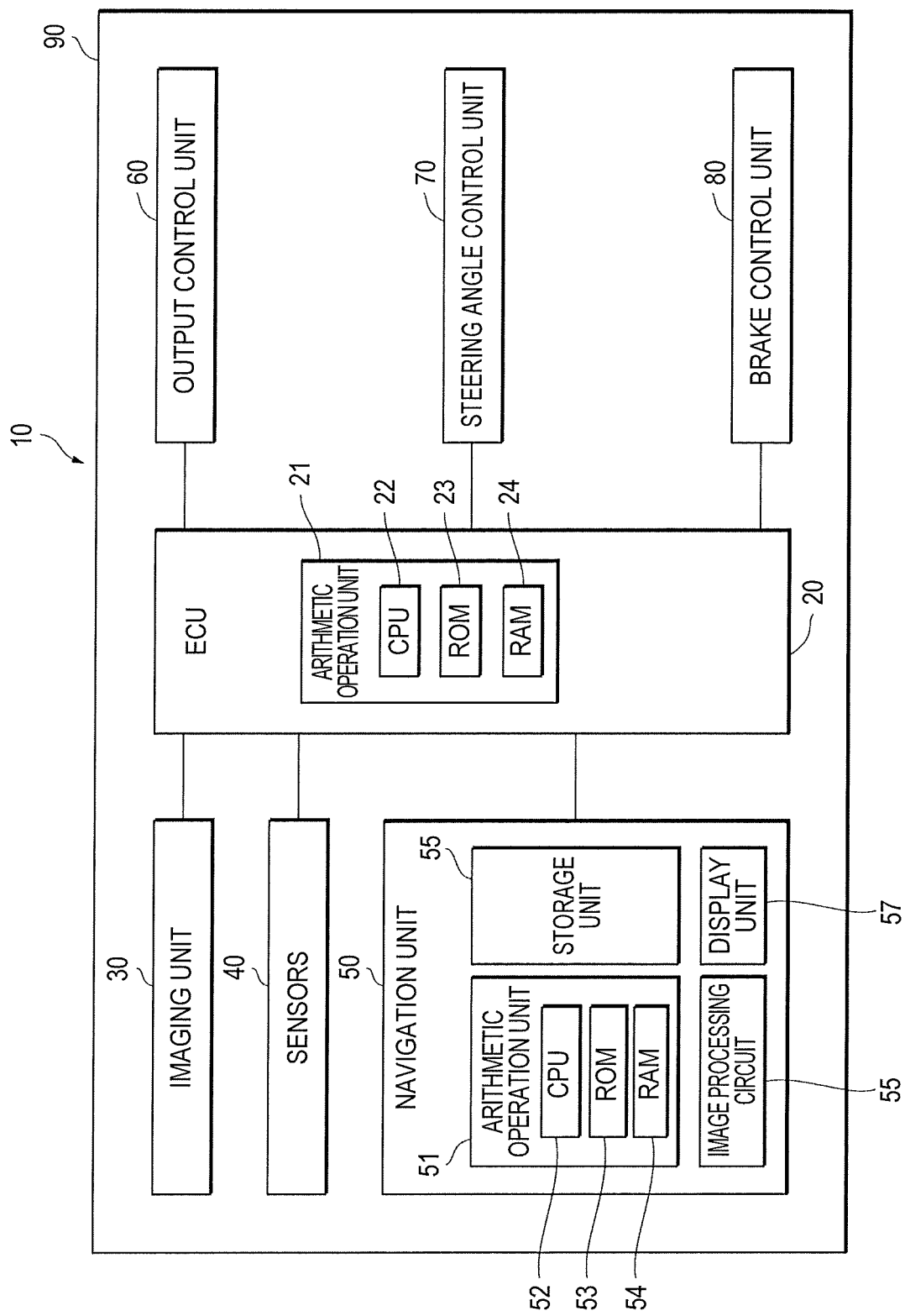
FIG. 1 is a diagram illustrating a configuration of an automated driving device according to a first embodiment of the present disclosure.

Hereinafter, embodiments of the present disclosure will be described with reference to the accompanying drawings. Here, the same reference signs refer to the same elements and description thereof will not be repeated. FIG. 1 is a diagram illustrating a configuration of an automated driving device 10 according to a first embodiment of the present disclosure. The automated driving device 10 is mounted in a vehicle 90 and is configured to control traveling of the vehicle 90. The vehicle 90 is, for example, a private vehicle or a commercial vehicle. The automated driving device 10 can switch a driving control mode of the vehicle 90 between an automated driving mode and a manual driving mode. Here, an automated driving mode refers to a driving mode in which the vehicle 90 is caused to travel automatically along a guide route from a current point to a destination point without allowing a driver to initiatively perform a driving operation. A manual driving mode refers to a driving mode in which the vehicle 90 is caused to travel by allowing a driver to initiatively perform a driving operation.

The automated driving device 10 includes an electronic control unit (ECU) 20, an imaging unit 30, sensors 40, a navigation unit 50, an output control unit 60, a steering angle control unit 70, and a brake control unit 80.

The imaging unit 30 is a camera including an image sensor that images circumstances near the vehicle 90 (for example, circumstances in front of, beside, and behind the vehicle). The imaging unit 30 images circumstances near the vehicle 90 in response to an instruction from the electronic control unit 20. Image information which is acquired by the imaging unit 30 may be a still image or a moving image.

The sensors 40 detect a variety of information which is used to control driving of the vehicle 90 in response to an instruction from the electronic control unit 20. The sensors 40 may include a position detecting device (for example, a global positioning system) that detects a position of the vehicle 90. The sensors 40 may include a gyro sensor that detects an angular velocity based on change in a traveling direction of the vehicle 90. The sensors 40 may include a travel distance sensor that detects a traveling speed or a moving distance of the vehicle 90. The sensors 40 may include a steering angle sensor that detects a steering angle of the vehicle 90. The sensors 40 may include a radar that detects traveling situations of other vehicles traveling near the vehicle 90 or whether there is an obstacle. The radar detects a preceding vehicle or a position and a relative speed of an obstacle, for example, by transmitting millimeter radio waves in front of the vehicle 90 and receiving millimeter radio waves which are reflected by a preceding vehicle or an obstacle.

The navigation unit 50 includes an arithmetic operation unit 51, a storage unit 55, an image processing circuit 56, and a display unit 57, and performs a navigation process (for example, setting of a retrieval start point, retrieval of a guide route, retrieval of a partial route, retrieval of a redundant route, or generation and output of route information) based on a variety of information (for example, information on a position, a speed, and a traveling direction of the vehicle 90) which is output from the sensors 40. Here, setting of a retrieval start point is to calculate coordinates (longitude and latitude) of positions serving as start points of guide route retrieval such as a departure point, a destination point, and a transit point. Retrieval of a guide route is to set a retrieval range of a guide route from the start point of route retrieval such as a departure point, a destination point, or a transit point and to retrieve a guide route that satisfies retrieval conditions. Retrieval of a redundant route is to retrieve an alternative route for replacement of the guide route to a destination point. A redundant route and an alternative route are synonymous with each other. Retrieval of a partial route is to retrieve a part of a redundant route which branches at a branch point on a guide route and reaches a destination point. A part of a redundant route and a partial route are synonymous with each other. Generation and output of route information is to generate and output an image signal for route guidance.

A road section from a certain intersection to another intersection is handled as a link of a graph based on a graph theory and the intersections are handled as nodes of the graph. In this specification, a "route" collectively refers to a guide route, a redundant route, and a partial route and "information on a route (route information)" refers to connection information of links of a route.

The arithmetic operation unit 51 includes a central processing unit (CPU) 52, a read only memory (ROM) 53, and a random access memory (RAM) 54. In the ROM 53, a navigation program for performing the above-mentioned navigation process is stored. The navigation program is read from the ROM 53 to the RAM 54 and is interpreted and executed by the CPU 52.

The storage unit 55 is a disk medium (for example, a magnetic recording medium or a magneto-optical recording medium) that stores map information with high precision. The map information with high precision corresponds to, for example, information associated with connection relationships between roads. The map information with high precision is map information with higher precision than normal map information for navigation. The map information with high precision includes, for example, information indicating a center position of each lane and information indicating a boundary between lanes. The map information with high precision may include road information, traffic regulation information, address information (addresses and post numbers), facility information, and phone number information. The road information includes information indicating a type of each road such as an expressway, a toll road, a national road, and a prefectural road or information such as the number of lanes in each road, a width of each lane, a gradient of each road, a position of each road (three-dimensional coordinates including longitude, latitude, and height), curvatures of curves of each lane, positions of merging and branch points of lanes, and traffic signs marked on each road. The traffic regulation information includes information indicating that a lane is blocked due to roadwork, traffic accidents, a traffic jam, or the like.

The image processing circuit 56 includes a buffer memory and a graphic controller, loads map information read from the storage unit 55 into the buffer memory, generates an image signal for guidance for a route using the graphic controller, and outputs the generated image signal to the display unit 57. The display unit 57 is, for example, a liquid crystal display unit.

In the manual driving mode, the navigation unit 50 guides a driver of the vehicle 90 along a guide route to a destination point. In the automated driving mode, the navigation unit 50 supplies information of the guide route to a destination point (connection information of links of the guide route) to the electronic control unit 20. The electronic control unit 20 controls automated driving of the vehicle 90 to the destination point based on the information of the guide route which is supplied from the navigation unit 50.

The electronic control unit 20 is a controller that controls automated driving of the vehicle 90. The electronic control unit 20 includes an arithmetic operation unit 21 as a hardware resource thereof. The arithmetic operation unit 21 includes a CPU 22, a ROM 23, and a RAM 24. An automated driving program for controlling automated driving of the vehicle 90 is stored in the ROM 23. The automated driving program is read from the ROM 23 to the RAM 24 and is interpreted and executed by the CPU 22. The electronic control unit 20 serves as an automated driving control unit in cooperation between the hardware resources and the automated driving program. The function of the automated driving control unit may be embodied by a single electronic control unit or may be embodied by a plurality of electronic control units which is connected to each other via an onboard communication network (for example, a controller area network or an Ethernet (registered trademark) network). The function of the automated driving control unit may be embodied using a dedicated hardware resource or firmware. Examples of the dedicated hardware resource include an application specific integrated circuit (ASIC) and a field programmable gate array (FPGA).

The output control unit 60 is an electronic control unit that controls output of a power source (for example, an engine or a traction motor) of the vehicle 90. The output control unit 60 controls output of the power source of the vehicle 90 in response to an instruction from the electronic control unit 20.

The steering angle control unit 70 is an electronic control unit that controls an electric power steering system of the vehicle 90. An assist motor of the electric power steering system generates a steering torque. The steering angle control unit 70 controls a steering angle of the vehicle 90 by controlling the assist motor in response to an instruction from the electronic control unit 20.

The brake control unit 80 is an electronic control unit that controls a brake system of the vehicle 90. The brake system is, for example, a hydraulic brake system. The brake control unit 80 controls a braking force of the vehicle 90 by adjusting a hydraulic pressure of the hydraulic brake system in response to an instruction from the electronic control unit 20.

When the driving control mode of the vehicle 90 is set to the automated driving mode, the electronic control unit 20 detects circumstances near the vehicle 90 based on image information indicating circumstances near the vehicle 90 which is imaged by the imaging unit 30, a variety of information (for example, information such as the position, the speed, and the traveling direction of the vehicle 90) which is detected by the sensors 40, and information on a guide route which is supplied from the navigation unit 50, and controls automated driving of the vehicle 90 by outputting instructions to the output control unit 60, the steering angle control unit 70, and the brake control unit 80 such that the vehicle 90 travels to a destination point.

The electronic control unit 20, the imaging unit 30, the sensors 40, the navigation unit 50, the output control unit 60, the steering angle control unit 70, and a brake control unit 80 are connected to each other via an onboard communication network.

Figure 2:
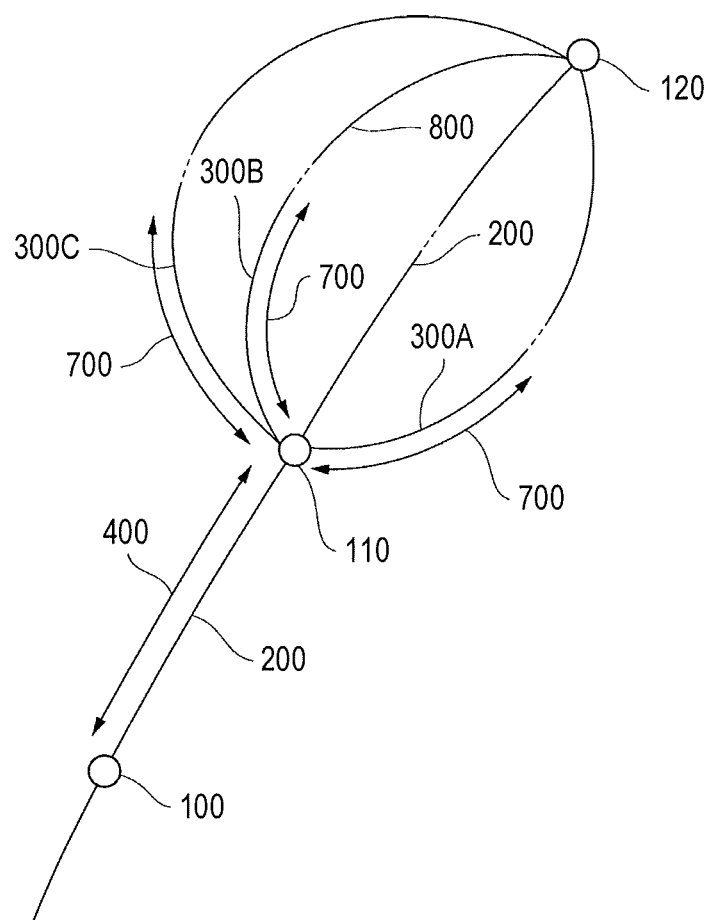
FIG. 2 is a diagram illustrating an example of an outline of a navigation process according to the first embodiment of the present disclosure.

FIG. 2 is a diagram illustrating an example of an outline of a navigation process according to the first embodiment of the present disclosure. In the drawing, reference numeral 100 represents a current point of the vehicle 90, reference numeral 120 represents a destination point of the vehicle 90, and reference numeral 200 represents a guide route from the current point 100 to the destination point 120. Reference numeral 110 represents a branch point on the guide route 200 through which the vehicle 90 is expected to pass. The branch point 110 is an intersection on an expressway or an intersection on a regular road.

The navigation unit 50 retrieves one or more partial routes 300A, 300B, and 300C other than the guide route 200 which branch at the branch point 110. The navigation unit 50 may start retrieval of one or more partial routes 300A, 300B, and 300C, for example, when a distance 400 between the current point 100 of the vehicle 90 and the branch point 110 becomes less than a threshold distance. The threshold distance is, for example, a distance equal to or greater than a distance by which the vehicle 90 moves after the navigation unit 50 has started retrieval of the partial routes 300A, 300B, and 300C until the retrieval is completed and is determined, for example, in consideration of a vehicle speed of the vehicle 90, an estimated retrieval time of the partial routes 300A, 300B, and 300C, and traffic information (for example, traffic jam information). Accordingly, the navigation unit 50 can complete retrieval of the one or more partial routes 300A, 300B, and 300C before the vehicle 90 passes through the branch point 110.

The navigation unit 50 reads information (connection information of links constituting the partial routes 300A, 300B, and 300C) of the one or more partial routes 300A, 300B, and 300C from the storage unit 55 and supplies the read information to the electronic control unit 20. The electronic control unit 20 temporarily stores the information of the one or more partial routes 300A, 300B, and 300C which is supplied from the navigation unit 50 in the RAM 24.

When the vehicle 90 departs from the guide route 200 at the branch point 110 and travels on a specific partial route 300B of the one or more partial routes 300A, 300B, and 300C, the navigation unit 50 retrieves a redundant route 800 for guiding the vehicle 90 to the destination point 120. The partial route 300B is a part of the redundant route 800 for guiding the vehicle 90 from the branch point 110 to the destination point 120. In the period until the navigation unit 50 completes retrieval of the redundant route 800, the electronic control unit 20 reads information of the specific partial route 300B (connection information of links constituting the redundant route 300B) from the RAM 24 and controls automated driving of the vehicle 90 based on the read information. Accordingly, even when the navigation unit 50 starts retrieval of the redundant route 800 with departure of the vehicle 90 from the guide route 200, it is possible to minimize suspension of cooperation between the electronic control unit 20 and the navigation unit 50.

It is assumed that the lengths 700 of the partial routes 300A, 300B, and 300C are determined such that the navigation unit 50 completes retrieval of the redundant route 800 before the vehicle 90 completes passing of the partial routes 300A, 300B, and 300C. The lengths 700 are determined, for example, in consideration of a time required for correlating connection information of links constituting the partial routes 300A, 300B, and 300C with the map information with high precision, a time required for specifying a lane of a road on which the vehicle 90 is traveling based on a variety of information detected by the sensors 40, a time required for planning a route by lanes based on the connection information of links constituting the partial routes 300A, 300B, and 300C and the map information with high precision, and traffic information (for example, traffic jam information).

Figure 3:
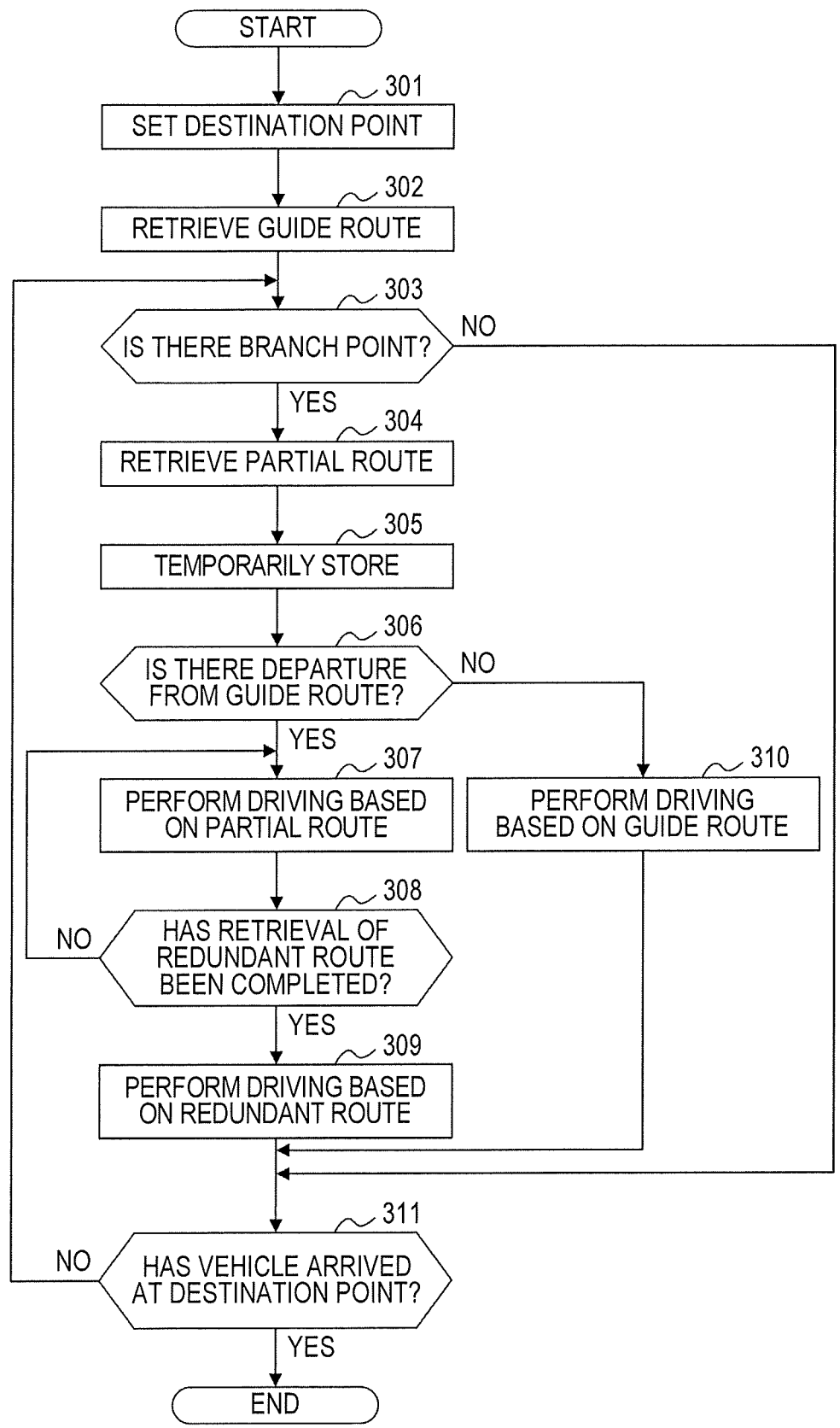
FIG. 3 is a flowchart illustrating an example of the navigation process according to the first embodiment of the present disclosure.

FIG. 3 is a flowchart illustrating an example of the navigation process according to the first embodiment of the present disclosure. Here, it is assumed that the vehicle 90 travels from a current point 100 to a destination point 120 in the automated driving mode.

In Step 301, the navigation unit 50 sets a destination point 120 based on designation by an occupant of the vehicle 90.

In Step 302, the navigation unit 50 retrieves a guide route 200 from the current point 100 to the destination point 120. When a plurality of candidates for the guide route 200 is retrieved by the navigation unit 50, one of the plurality of candidates may be selected by the occupant of the vehicle

90. The electronic control unit 20 controls automated driving of the vehicle 90 to the destination point based on information of the guide route 200 which is supplied from the navigation unit 50.

In Step 303, the navigation unit 50 determines whether there is a branch point 110 in the traveling direction of the vehicle 90. In Step 303, it is determined whether there is a branch point 110 through which the vehicle 90 is expected to pass within a predetermined time out of a plurality of branch points 110 on the guide route 200.

In Step 304, the navigation unit 50 retrieves one or more partial routes 300A, 300B, and 300C other than the guide route 200 which branch at the branch point 110. The navigation unit 50 reads information of the one or more partial routes 300A, 300B, and 300C from the storage unit 55 and supplies the read information to the electronic control unit 20. The process of Step 304 is repeatedly performed by the number of branch points 110 through which the vehicle 90 is expected to pass.

In Step 305, the electronic control unit 20 temporarily stores the information of the one or more partial routes 300A, 300B, and 300C which is supplied from the navigation unit 50 in the RAM 24.

In Step 306, the navigation unit 50 determines whether the vehicle 90 departs from the guide route 200 at the branch point 110.

In Step 307, the navigation unit 50 instructs to retrieve a redundant route 800. In a period until the navigation unit 50 completes retrieval of a redundant route 800, the electronic control unit 20 reads information of the partial route 300B from the RAM 24 and controls automated driving of the vehicle 90 based on the read information.

In Step 308, the navigation unit 50 determines whether retrieval of the redundant route 800 has been completed. When retrieval of the redundant route 800 has been completed, the navigation unit 50 supplies information of the redundant route 800 to the electronic control unit 20.

In Step 309, the electronic control unit 20 controls automated driving of the vehicle 90 to the destination point based on the information of the redundant route 800 which is supplied from the navigation unit 50.

In Step 310, the electronic control unit 20 controls automated driving of the vehicle 90 to the destination point based on the information of the guide route 200 which is supplied from the navigation unit 50.

In Step 311, the navigation unit 50 determines whether the vehicle 90 has arrived at the destination point 120.

According to the first embodiment of the present disclosure, the navigation unit 50 can retrieve one or more partial routes 300A, 300B, and 300C other than the guide route 200 which branch at the branch point 110 through which the vehicle 90 is expected to pass before the vehicle 90 has passed through the branch point 110, and temporarily store information of the retrieved partial routes 300A, 300B, and 300C in the RAM 24 of the electronic control unit 20. Accordingly, even when the navigation unit 50 starts retrieval of the redundant route 800 with departure of the vehicle 90 from the guide route 200 as a trigger, it is possible to minimize suspension of cooperation between the electronic control unit 20 and the navigation unit 50.

Figure 4:
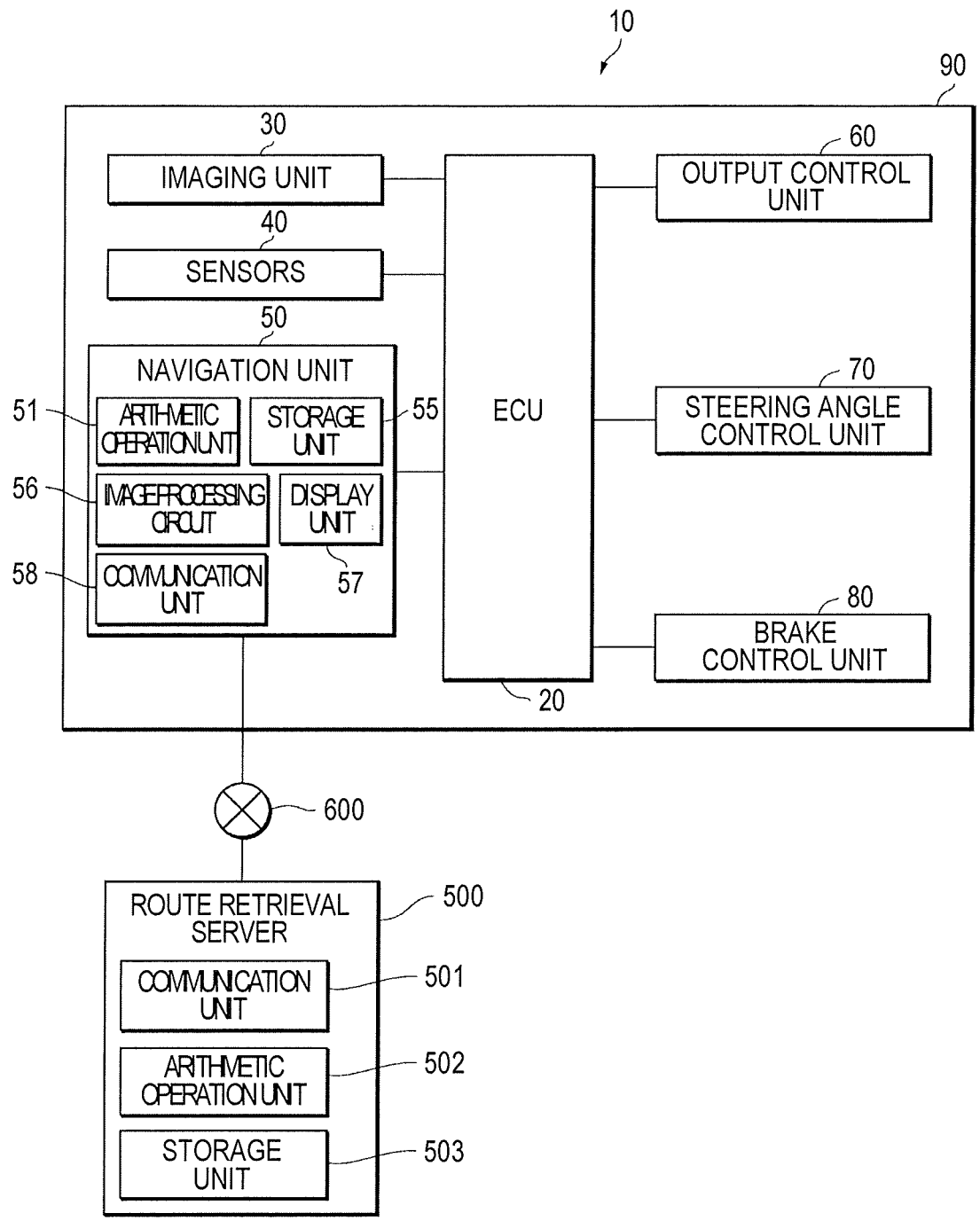
FIG. 4 is a diagram illustrating a configuration of an automated driving device according to a second embodiment of the present disclosure.

FIG. 4 is a diagram illustrating a configuration of an automated driving device 10 according to a second embodiment of the present disclosure. The first embodiment is different from the second embodiment, in that the navigation unit 50 retrieves a route in the first embodiment but a route retrieval server 500 retrieves a route in the second embodiment of the present disclosure, and both are the same in the other points. In the following description, the difference therebetween will be mainly described and the same points will not be described.

The navigation unit 50 includes a communication unit 58 that performs radio communication with the route retrieval server 500 via a network 600. The network 600 is, for example, a mobile communication network. The route retrieval server 500 includes a communication unit 501, an arithmetic operation unit 502, and a storage unit 503, and these hardware resources are the same as the communication unit 58, the arithmetic operation unit 51, and the storage unit 55 of the navigation unit 50. Map information is stored in the storage unit 503.

Figure 5:
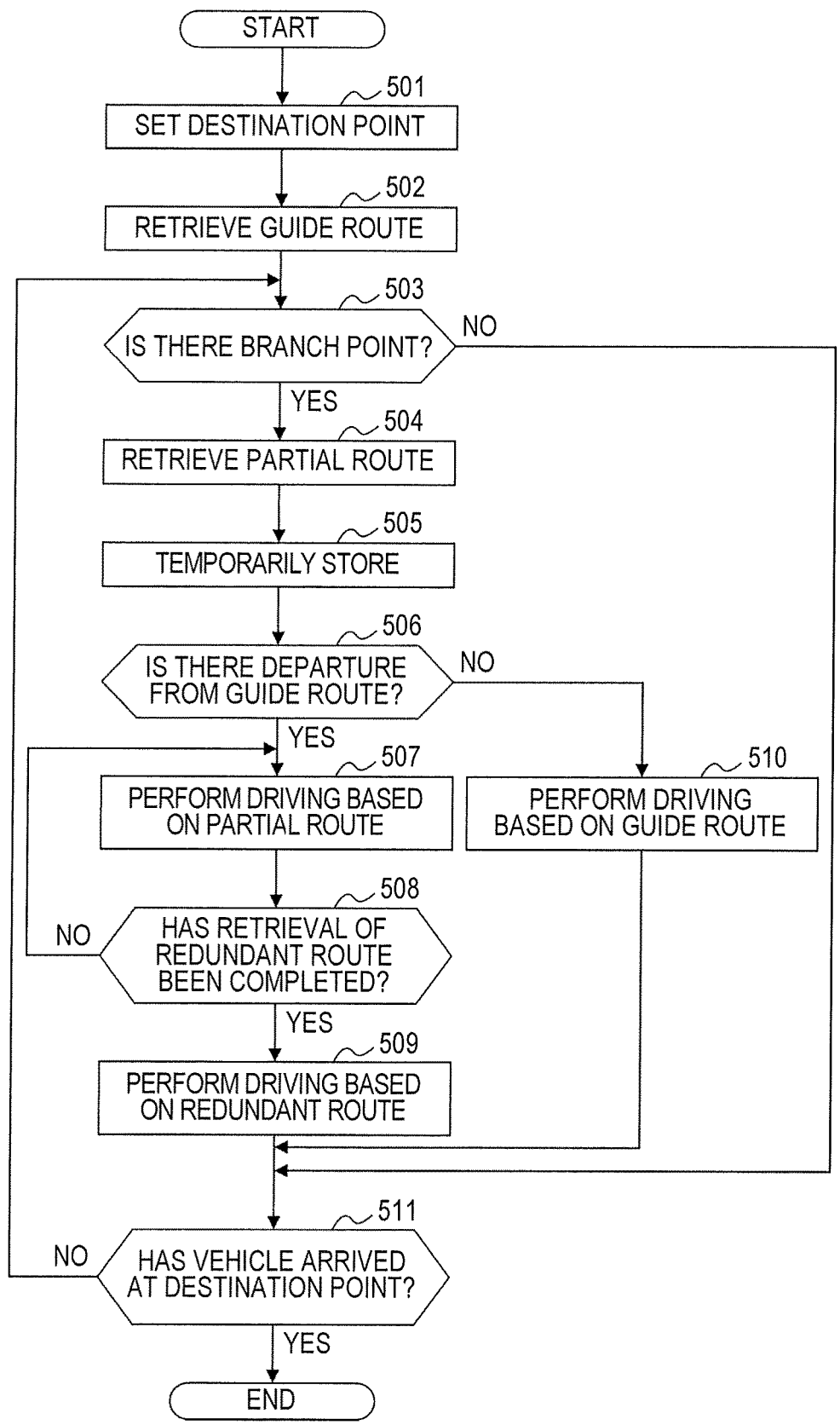
FIG. 5 is a flowchart illustrating an example of a navigation process according to the second embodiment of the present disclosure.

FIG. 5 is a flowchart illustrating an example of a navigation process according to the second embodiment of the present disclosure. Here, it is assumed that the vehicle 90 travels from a current point 100 to a destination point 120 in the automated driving mode. It is assumed that the navigation unit 50 transmits position information of the vehicle 90 to the route retrieval server 500 at predetermined intervals.

In Step 501, the navigation unit 50 requests the route retrieval server 500 to retrieve a guide route 200 from the current point 100 to the destination point 120 when designation of the destination point 120 is received based on designation by an occupant of the vehicle 90.

In Step 502, the route retrieval server 500 retrieves a guide route 200 from the current point 100 to the destination point 120. When a plurality of candidates for the guide route 200 is retrieved by the route retrieval server 500, one of the plurality of candidates may be selected by the occupant of the vehicle 90. The route retrieval server 500 supplies information of the guide route 200 to the navigation unit 50. The navigation unit 50 supplies the information of the guide route 200 to the electronic control unit 20. The electronic control unit 20 controls automated driving of the vehicle 90 to the destination point based on information of the guide route 200 which is supplied from the navigation unit 50.

In Step 503, the route retrieval server 500 determines whether there is a branch point 110 in the traveling direction of the vehicle 90. In Step 503, it is determined whether there is a branch point 110 through which the vehicle 90 is expected to pass within a predetermined time out of a plurality of branch points 110 on the guide route 200.

In Step 504, the route retrieval server 500 retrieves one or more partial routes 300A, 300B, and 300C other than the guide route 200 which branch at the branch point 110. The route retrieval server 500 may start retrieval of the one or more partial routes 300A, 300B, and 300C when the distance 400 between the current point 100 of the vehicle 90 and the branch point 110 becomes less than a threshold distance. The threshold distance is, for example, a distance equal to or greater than a distance by which the vehicle 90 moves after the route retrieval server 500 has started retrieval of the partial routes 300A, 300B, and 300C until the retrieval is completed and is determined, for example, in consideration of a vehicle speed of the vehicle 90, an estimated retrieval time of the partial routes 300A, 300B, and 300C, and traffic information (for example, traffic jam information). Accordingly, the route retrieval server 500 can complete retrieval of the one or more partial routes 300A, 300B, and 300C before the vehicle 90 passes through the branch point 110. The route retrieval server 500 reads information of the one or more partial routes 300A, 300B, and 300C from the storage unit 503 and supplies the read information to the navigation unit 50. The navigation unit 50 supplies the information of the one or more partial routes 300A, 300B, and 300C to the electronic control unit 20. The process of Step 504 is repeatedly performed by the number of branch points 110 through which the vehicle 90 is expected to pass.

In Step 505, the electronic control unit 20 temporarily stores the information of the one or more partial routes 300A, 300B, and 300C which is supplied from the navigation unit 50 in the RAM 24.

In Step 506, the route retrieval server 500 determines whether the vehicle 90 departs from the guide route 200 at the branch point 110.

In Step 507, the route retrieval server 500 instructs to retrieve a redundant route 800. In a period until the route retrieval server 500 completes retrieval of a redundant route 800, the electronic control unit 20 reads information of the partial route 300B from the RAM 24 and controls automated driving of the vehicle 90 based on the read information.

In Step 508, the route retrieval server 500 determines whether retrieval of the redundant route 800 has been completed. When retrieval of the redundant route 800 has been completed, the route retrieval server 500 supplies information of the redundant route 800 to the navigation unit 50.

In Step 509, the electronic control unit 20 controls automated driving of the vehicle 90 to the destination point based on the information of the redundant route 800 which is supplied from the navigation unit 50.

In Step 510, the electronic control unit 20 controls automated driving of the vehicle 90 to the destination point based on the information of the guide route 200 which is supplied from the navigation unit 50.

In Step 511, the route retrieval server 500 determines whether the vehicle 90 has arrived at the destination point 120.

The lengths 700 of the partial routes 300A, 300B, and 300C are determined, for example, in consideration of a time required for communication between the navigation unit 50 and the route retrieval server 500, a time required for correlating connection information of links constituting the partial routes 300A, 300B, and 300C with the map information with high precision, a time required for specifying a lane of a road on which the vehicle 90 is traveling based on a variety of information detected by the sensors 40, a time required for planning a route by lanes based on the connection information of links constituting the partial routes 300A, 300B, and 300C and the map information with high precision, and traffic information (for example, traffic jam information).

According to the second embodiment of the present disclosure, the route retrieval server 500 can retrieve one or more partial routes 300A, 300B, and 300C other than the guide route 200 which branch at the branch point 110 through which the vehicle 90 is expected to pass before the vehicle 90 has passed through the branch point 110, and temporarily store information of the retrieved partial routes 300A, 300B, and 300C in the RAM 24 of the electronic control unit 20. Accordingly, even when the route retrieval server 500 starts retrieval of the redundant route 800 with departure of the vehicle 90 from the guide route 200 as a trigger, it is possible to minimize suspension of cooperation between the electronic control unit 20 and the navigation unit 50.

The above-mentioned embodiments are for facilitating understanding of the present disclosure but are not to be interpreted as limiting the applicable embodiment. The present disclosure can be modified or improved without departing from the gist thereof and equivalents thereto are included in the present disclosure.

What is claimed is:

1. An automated driving device comprising:
a navigation unit including circuitry configured to retrieve one or more partial routes with a predetermined length other than a guide route which branch from the guide route at a branch point through which a vehicle is expected to pass before the vehicle passes through the branch point; and
an electronic control unit configured to
determine whether the vehicle departs from the guide route at the branch point while the vehicle is moving to a destination point,
when it is determined that the vehicle departs from the guide route at the branch point, request retrieval of a redundant route for guiding the vehicle to the destination point by the navigation unit, and control automated driving of the vehicle based on information of a specific partial route out of the one or more partial routes in a period of time until the navigation unit completes retrieval of the redundant route, and
when the retrieval of the redundant route is completed by the navigation unit, control automated driving of the vehicle based on information of the redundant route,
wherein the predetermined length is set such that the navigation unit completes retrieval of the redundant route before traveling of the vehicle on the specific partial route is completed.

2. The automated driving device according to claim 1, wherein the navigation unit is configured to retrieve the one or more partial routes with an event in which a distance between the vehicle and the branch point becomes less than a threshold distance as a trigger.

3. The automated driving device according to claim 1, wherein the redundant route is an alternative route for replacement of the guide route to the destination point.

4. The automated driving device according to claim 1, wherein the information of the specific partial route is supplied from the navigation unit, and the electronic control unit is configured to control automated driving of the vehicle to the destination point based on the information of the redundant route supplied from the navigation unit.

5. An automated driving device comprising:
a navigation unit including circuitry configured to retrieve one or more partial routes with a predetermined length other than a guide route which branch from the guide route at a branch point through which a vehicle is expected to pass from a route retrieval server before the vehicle passes through the branch point; and
an electronic control unit configured to
determine whether the vehicle departs from the guide route at the branch point while the vehicle is moving to a destination point,
when it is determined that the vehicle departs from the guide route at the branch point, request retrieval of a redundant route for guiding the vehicle to the destination point by the route retrieval server, and control automated driving of the vehicle based on information of a specific partial route out of the one or more partial routes in a period of time until the route retrieval server completes retrieval of the redundant route, and
when the retrieval of the redundant route is completed by the route retrieval server, control automated driving of the vehicle based on the redundant route, wherein the predetermined length is set such that the route retrieval server completes retrieval of the redundant route before traveling of the vehicle on the specific partial route is completed.

6. The automated driving device according to claim 5, wherein the route retrieval server is configured to retrieve the one or more partial routes with an event in which a distance between the vehicle and the branch point becomes less than a threshold distance as a trigger.

7. The automated driving device according to claim 5, wherein the redundant route is an alternative route for replacement of the guide route to the destination point.

8. The automated driving device according to claim 5, wherein the information of the specific partial route is supplied from the navigation unit, and the electronic control unit is configured to control automated driving of the vehicle to the destination point based on the information of the redundant route supplied from the navigation unit.

* * * * *